(12) United States Patent
Troitski

(10) Patent No.: US 6,333,486 B1
(45) Date of Patent: Dec. 25, 2001

(54) METHOD AND LASER SYSTEM FOR CREATION OF LASER-INDUCED DAMAGES TO PRODUCE HIGH QUALITY IMAGES

(75) Inventor: Igor Troitski, .853 Arrowhead Trail, Henderson, NV (US) 89015

(73) Assignee: Igor Troitski, Henderson, NV (US)

( * ) Notice: Subject to any disclaimer, the term of this patent is extended or adjusted under 35 U.S.C. 154(b) by 0 days.

(21) Appl. No.: 09/557,306

(22) Filed: Apr. 25, 2000

(51) Int. Cl.$^7$ .................................................. B23K 26/00
(52) U.S. Cl. ................................. 219/121.69; 219/121.62
(58) Field of Search ...................... 219/121.61, 121.62, 219/121.68, 121.69, 121.85

(56) References Cited

U.S. PATENT DOCUMENTS

| | | |
|---|---|---|
| 4,092,518 | 5/1978 | Merard . |
| 4,843,207 | 6/1989 | Urbanek et al. . |
| 5,206,496 | 4/1993 | Clement et al. . |
| 5,575,936 | 11/1996 | Goldfarb . |
| 5,637,244 | 6/1997 | Erokhin . |
| 5,886,318 | 3/1999 | Vasiliev et al. . |
| 6,087,617 | * 7/2000 | Troitski et al. ................... 219/121.6 |

FOREIGN PATENT DOCUMENTS

| | | |
|---|---|---|
| 0743128 | 11/1996 | (EP) . |
| 321422 | 11/1970 | (RU) . |
| 20082288C1 | 2/1994 | (RU) . |
| 1838163 | 8/1993 | (SU) . |
| 96/30219 | 10/1996 | (WO) . |

* cited by examiner

*Primary Examiner*—Samuel M. Heinrich

(57) ABSTRACT

Embodiments of methods and laser system for creating laser-induced damages inside a transparent material are disclosed. One or more embodiments of the invention comprise a method and system for production of an etch point by generating breakdowns in several separate focused small points inside the etch point area. Other embodiments of the invention comprise a method for production of etch points which have the same size but different brightness. Laser-induced damages produced by this method permit to reproduce image gradation without changing of their spatial resolution. According to the invention it is made by variation of a number of focused small points inside an etch point area. Other embodiments of the invention comprise method for creation of an etch point with desirable form. Using such etch points it is possible to produce images which from different directions will have right brightness.

8 Claims, 4 Drawing Sheets

METHOD AND LASER SYSTEM FOR CREATION OF LASER-INDUCED DAMAGES TO PRODUCE HIGH QUALITY IMAGES

FIELD OF THE INVENTION

The present invention relates to a method and apparatus for producing high quality laser-induced damage images in transparent objects.

BACKGROUND OF THE INVENTION

A number of techniques for creating a variety of patterns on the surface and inside of transparent substrates using pulsed laser radiation are well known.

One publication disclosing such techniques is the Russian invention #321422 to Agadjanov et al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al., discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He-Ne laser emits a secondary beam of visible laser radiation with a wavelength of 638 $\mu$m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming of image in solid media by the way of processing of optically transparent solid material by the beam of radiation with changeable energy for creation of the image.

Russian patent publication RU 20083388 C1 to Oshemkov discloses a process for laser forming of images in solid media by the way of focusing of laser radiation inside the volume of sample which differs by the following: with the aim to save the surface and the volume of the sample before the definite point and creation of three dimensional images, the sample is illuminated with the power density higher than the threshold of volume breakdown and moving the sample relatively to the laser beam in three orthogonal directions.

WIPO Patent Document No. 96/30219 to Lebedev et al. discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre- programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is discloses. Accordance to the method microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,575,936 to A. Vasiliev and B. Goldfarb discloses a method for laser-assisted image formation in transparent specimens which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material, which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

U.S. patent application Ser. No. 08/643,918, U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

Images comprising laser- generated etch points produced by all aforementioned systems and methods generally suffer from having a low quality. The quality of laser-induced damage images is determined by following principal parameters:

1) spatial resolution;
2) adequate reproduction of grade shades
3) dispersion character of light reflected from a laser-induced damage;
4) artistic effect.

These parameters are determined by form and sizes of each laser induced-damage. Commonly, those etch points that are produced in glass by aforementioned methods, have random star forms in plane perpendicular to the direction of the laser beam. Such form of laser induced-damage is not desirable because it does not give a chance to produce high quality images.

The first, the random etch points have random effective sizes. The distance between adjacent damages should be larger if sizes of etch points is larger (only in this case it is possible to avoid an internal split between several separate etch points). Therefore it is necessary to produce etch points with the large distance between them to have a low probability of an internal split. This demand gives rise to low spatial resolution.

The second, the etch points with random shape have random area of modified refraction index and this gives fluctuation of light reflected from them, consequently, adequate reproduction of grade shades is impossible.

The third, the etch points with random shape have random light dispersion character, consequently, contrast of any image fluctuates.

The fourth, both brightness fluctuation of one etch point for different direction and brightness fluctuation between separate damages are visible by naked eyes and it creates undesirable (not artistic) effect.

Moreover, generally different grade of shades are reproduced by variation of laser damage sizes. Different sizes of microdestructions are created by changing of the focusing sharpness (U.S. Pat. No. 5,637,244 to Erokhin, U.S. Pat. No. 5,575,936 to A. Vasiliev and B. Goldfarb), the radiation power (U.S. Pat. No. 5,637,244 to Erokhin, Soviet patent publication 1838163 to Agrynsky, et. al) or repeat of laser pulses in the same point (Soviet patent publication 1838163 to P. V. Agrynsky, et. al). In all cases etch points are changed in size and consequently reproduction of grade shades influences on the spatial resolution of an image (variation of damage size necessitates variation of distance between adjacent etch points). Just therefore U.S. Pat. No. 5,637,244 to Erokhin disclose a method only "for forming a predetermined half-tone (not grade shade) image inside a transparent material". Moreover each image has its minimal resolution which is needed for reproduction of its small details, and therefore the increase of size has its limitation for each image. At last, it is not possible to reach high artistic effect when the same image is produced by etch points with random sizes.

SUMMARY OF THE INVENTION

The present invention has its principal task to provide a method and apparatus for creating laser-induced damages inside a transparent material so as the exterior light scattered from them has low fluctuations and so as it is possible to reproduce gray shades of an image using etch points with the same size.

One or more embodiments of the invention comprise a method and system for production of an etch point by simultaneously generating breakdowns in several separate focused small points inside the transparent material area corresponding to this etch point. Fluctuations of light reflected from the laser-induced damage become lower when a number of focused small points located inside said area is increased.

Other embodiments of the invention comprise a method for production of etch points which have the same size but different brightness. According to the invention it is made by variation of a number of separate focused small points inside the transparent material area and by control of positional relationship of this small points. Damages produced by this method permit to reproduce image gradation without changing of their spatial resolution.

Other embodiments of the invention comprise method for control of an etch point form and creation of laser-induced damages of right form. Any laser-induced damage form can be produced by specific arrangement of focal spots inside its area. Using these etch points it is possible to produce images which have different brightness from different directions.

DESCRIPTION OF THE DRAWINGS

FIG. 2(a) is a spot where laser beam is focused. FIG. 2(b) is an etch point produced by pulse laser energy $E_1$; FIG. 2(c) is an etch point produced by pulse laser energy $E_2 > E_1$; FIG. 2(d) is an etch point produced by pulse laser energy $E_3 > E_2$;

DETAILED DESCRIPTION OF THE INVENTION

The invention comprises a methods and apparatus for generating laser induced-damages inside an optically transparent material for production of high quality images. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The principal concepts of the invention are based on the following pieces of evidence of laser-induced damage mechanisms:
1) Plasma is produced in a laser beam focal spot if power laser energy is larger than an energy threshold;
2) Plasma produces the shock wave which induces the cracks (laser-induced damage) when the shocked stress becomes larger than the fracture threshold;
3) The value of energy threshold follows an inverse relation with focal spot size;
4) Commonly laser-induced damage has random star form in plane perpendicular to the direction of the laser beam;
5) The effective size of a laser-induced damage is considerably larger than the size of the laser beam focal spot corresponding to the damage;
6) The effective size of a laser-induced damage becomes larger if a size of a laser beam focal spot is increased;
7) The effective size of a fracture becomes larger when pulse laser energy is increased;
8) Separate damages can be produced if distance between adjacent focal spots corresponding to them is larger than distance threshold "$d_0$" ($d_0$ is a minimal distance between adjacent focal spots which avoids an internal split between the separate etch points).

Figure 1:
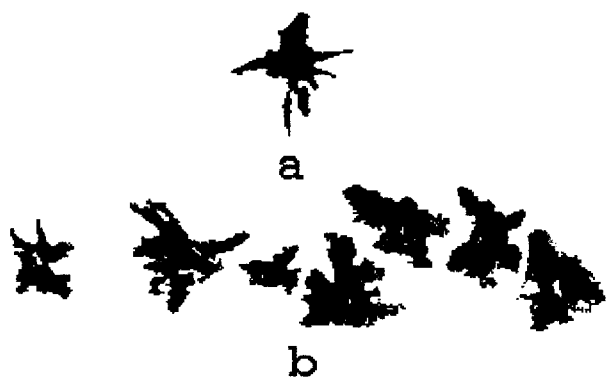
FIGS. 1(a) and (b) show examples of typical projections of laser-induced damages on plane normal to laser beam produced inside the optically polished high-index lead oxide cut glass (From I. N. Troitski in "Laser-Induced Damage in Optical Materials: 1999, Proc of SPIE Vol. 3902, 2000).
Figure 2:
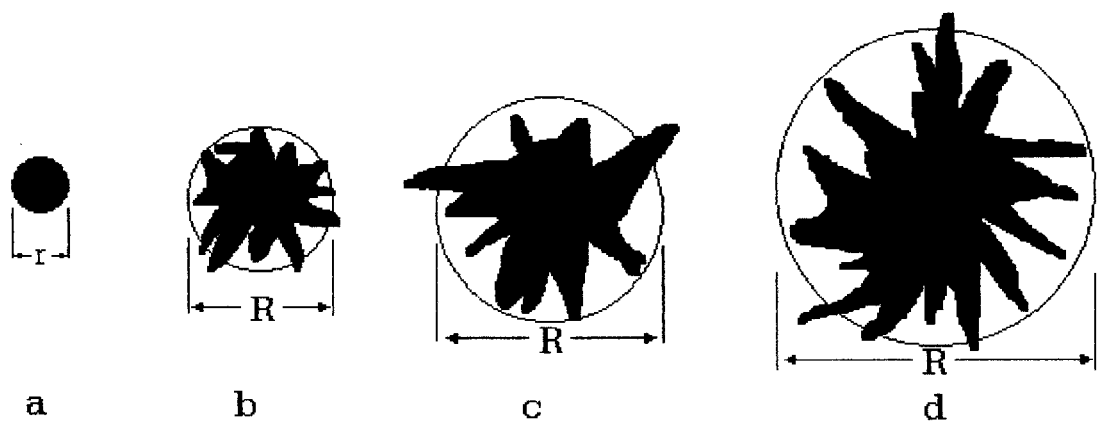
FIGS. 2(a)–(d) show a focal spot and examples of typical projections of etch points on plane XY, the projections perpendicular to a laser beam.

Reference is now made to FIG. 1, which illustrates typical projections of laser-induced damages produced inside the optically polished high-index lead oxide cut glass. FIG. 2 illustrates variation of sizes of laser induced damages: an etch point becomes large when laser pulse energy increases, simultaneously size fluctuations along different directions increase. Etch points should be enough large so as we can see them by naked eyes. Namely therefore in all aforementioned methods, laser radiation, which is focused in one point has great pulse energy which exceeds an energy threshold considerably, and namely therefore damage sizes have large fluctuations.

Figure 3:
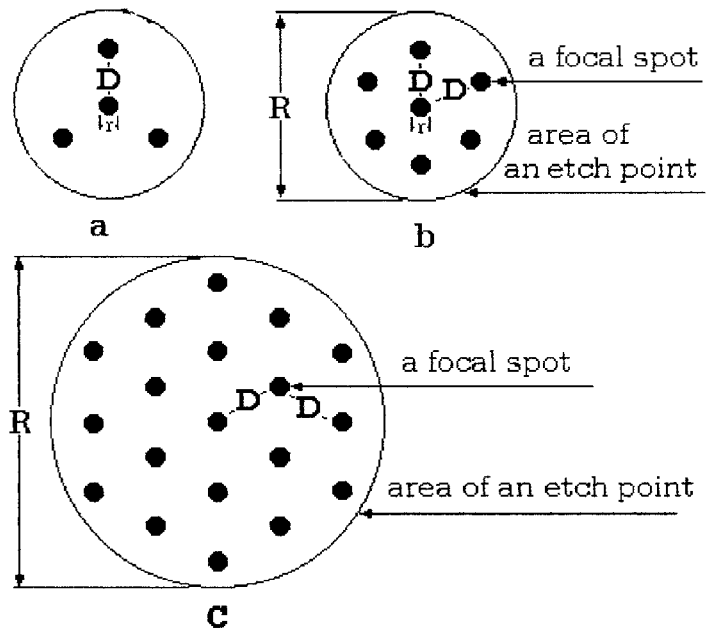
FIGS. 3(a) and (b) show examples of typical arrangements of focal spots inside area of etch points: (a)—seven focal spots are used; (b)—nineteen focal spots are used; "r" is a size of a focal spot, "R" is a size of an etch point, "D" is a distance between adjacent focal spots.

A method of the present invention discloses principal another way of creation of laser-induced damages. The principal concept of the present method is to focus laser radiation in several small focal spots so as the pulse energy in the each small spot exceeds an energy threshold not considerably and to arrange all these small spots so as to cover all area of an etch point uniformly. There are two different ways of the cover: 1) a distance between adjacent separate small spots is smaller than "$d_0$" (distance threshold) and 2) a distance between adjacent separate small spots is larger than "$d_0$". If a distance between adjacent separate small spots is smaller than "$d_0$" (but not considerably) than internal split between adjacent spot occurs and the damage area covers all area of an etch point uniformly approximately. A method of generating an laser-induced damage in accordance with the embodiment of the invention is as follows:

Step 1: an effective form and an effective size (R) of a laser-induced damage, which is good visible by naked eyes are determined;

Step 2: a focal spot size (r) is found using values of laser pulse energy and energy threshold of the transparent material;

Step 3: a number of focal spots allocated inside a laser-induced damage for production of a black-white image is determined;

Step 4: an arrangement of focal spots inside an area of a laser-induced damage for production of a black-white image is determined;

Step 5: a number of focal spots allocated inside a laser-induced damage for production of a gray-shade image is determined;

Step 6: an arrangement of focal spots inside an area of a laser-induced damage for production of a gray-shade image is determined;

FIGS. 3–6 illustrate these steps. FIG. 3 shows three etch point areas and possible arrangements of focal spots inside them. A focal spot has a size of "r" and an etch point area has an effective size of "R". Distance between adjacent focal spots equals to the same value "D".

Figure 4:
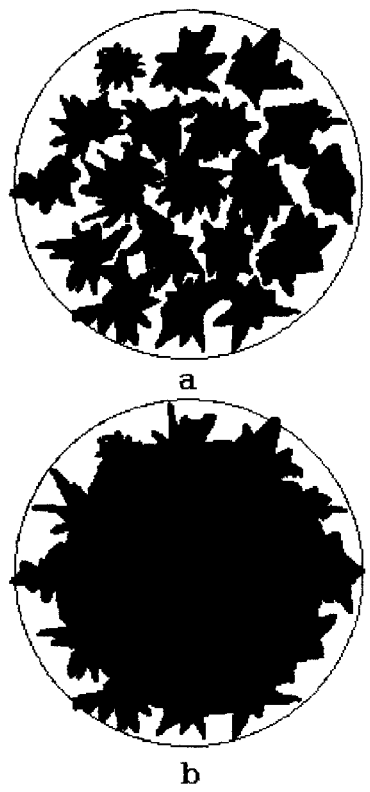
FIG. 4 shows creation of laser-induced damage inside an etch point area; (a)—starting formation of a damage; (b)—perfected damage for $D < d_0$ ($d_0$ is a minimal distance between adjacent focal spots which avoids an internal split between the separate etch points).

FIG. 4 shows creation of laser-induced damage inside an etch point area; FIG. 4(a) illustrates the first generation of a damage when plasma of laser beam focal spots produces the shock wave which induces the cracks around the focal spots; FIG. 4(b) illustrates the last stage after when shocked stress covers all etch point area. The damage corresponds to the case when distances between adjacent separate small spots are smaller than distance threshold "$d_0$". The black area corresponds to the area where refraction index is changed.

Figure 5:
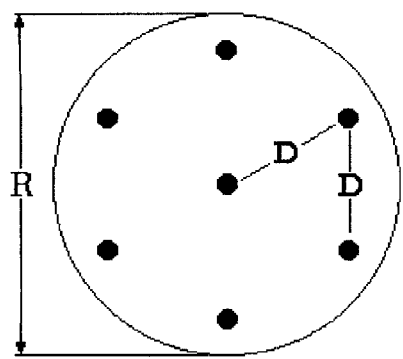
FIG. 5 shows creation laser-induced damage inside an etch point area for production of a grade shade image; (a)—an arrangement of focal spots inside an etch point area ($D > d_0$); (b)—perfected damage.
Figure 5:
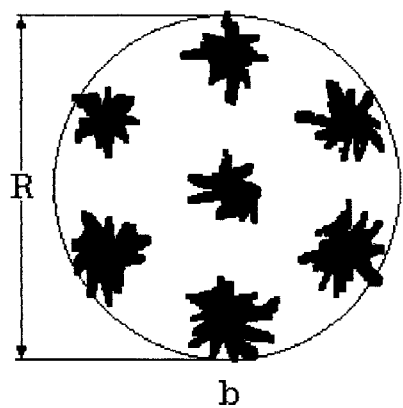
Figure 6:
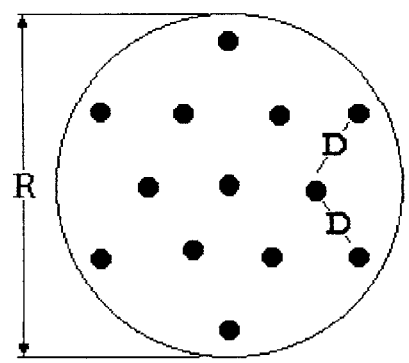
FIG. 6 shows an example of creation laser-induced damage inside an etch point area for production of an image gradation; (a)—an arrangement of focal spots inside area of an etch point ($D > d_0$); (b)—perfected damage.
Figure 6:
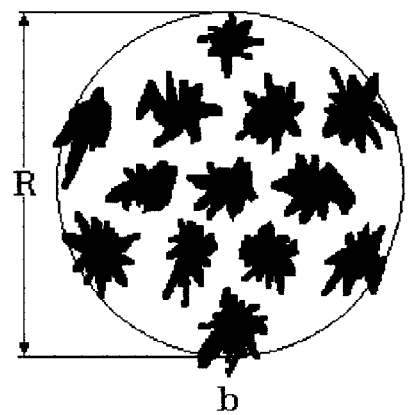

FIGS. 5 and 6 show creation of etch points where distances between adjacent separate small spots are larger than distance threshold "$d_0$". In this case an etch point consists of separate laser-induced damages. An etch point has greater brightness of reflected light if an modified refraction index area is larger. Consequently, the brightness of etch point is directly proportional to a number of focal spots lying inside a point: a point of FIG. 5 has greater brightness than a point of FIG. 6. Usually, distances between adjacent separate laser-induced damages are small so that we can not see them separately by naked eyes and an etch point looks like an integration.

Figure 7:
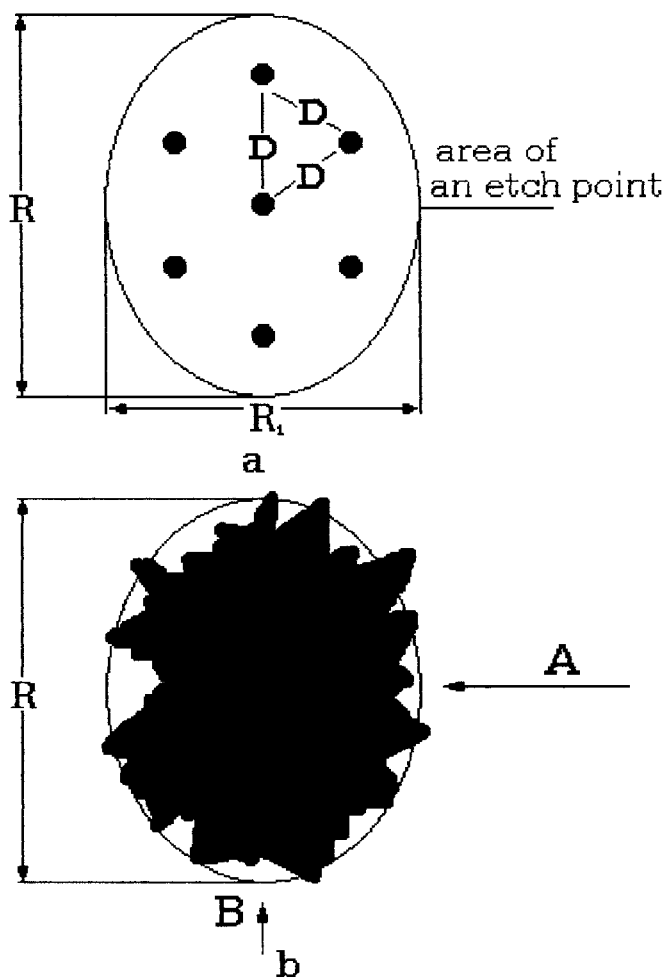
FIG. 7 shows an example of creation laser-induced damage inside an etch point area with ellipse form; (a)—an arrangement of focal spots inside ellipse area of an etch point ($D > d_0$); (b)—perfected damage.

FIGS. 7 shows an example of laser-induced damage creation inside an etch point area of an ellipse form. Similarly, establishing an area form of an etch point and covering it by small focal spots one can create desirable damage form. Using such etch points it is possible to produce images which from different directions will have desirable brightness. So all etch points are have the same form approximately, image brightness dose not fluctuate but can be changed by desired way. For example, if a laser-induced damage image is produced by points like in FIG. 7(*b*) then its brightness will change from maximum value (direction A) to minimum value (direction B).

Each step has its particularity.

Step 1

On the one hand, when etch points are increased then the spatial resolution is decreased. On the other hand, the larger etch points give higher brightness of light reflected from them. Consequently, there is optimal effective size (R) for a laser-induced damage.

Step 2

On the one hand, an energy threshold is larger for a smaller focal spot. On the other hand, when larger energy threshold is higher then star cracks are larger. Consequently, there is optimal size (r) of a focal spot.

Step 3

On the one hand, fluctuations of averaged light reflected from etch point are lower if a number of small spots is greater. On the other hand, the great number of small spots can give a great internal split, which disrupts damage form. Consequently, there is optimal number (N) of focal spots.

Step 4

On the one hand, small focal spots should be arranged so as their number inside etch point area is maximal. On the other hand, distance between adjacent separate small spots should be not considerably smaller than "$d_0$" so as internal split does not wreck a form of damage. Consequently, there is optimal arrangement of focal spots inside an area of a laser-induced damage for production a black-white image.

Step 5

On the one hand, a number of focal spots allocated inside a laser-induced damage for image gradation production should be smaller than for black-white image. On the other hand, the number should be enough great so as reflected light fluctuation should be low. Consequently, there is optimal number of focal spots allocated inside a laser-induced damage for production of gray-shade images.

Step 6

On the one hand, distance between adjacent focal spots inside an area of a laser-induced damage for production a gray-shade image should be larger than "$d_0$". On the other hand the focal spots should cover all area of etch point uniformly and it is desirable that we can not see damages corresponding these focal spots separately by naked eyes.

Given below is an example of creation of etch points, using the method proposed herein.

EXAMPLE

Suppose we need to produce a laser-induced damage image inside the transparent material.

Step 1

Taking into account the small details of the image and desired brightness, we determine that the form of projections of laser-induced damages on plane normal to laser beam should be a circle with diameter R=0.3 mm.

Step 2

The energy threshold is decreased when a focal spot size is increased. Taking into account this dependence, we find that optimal value of laser pulse energy for one spot is E=0.8 mJ when the value of energy threshold of the material is $E_0=80J/cm^2$, then diameter "r" of a single focal spot is $r=(4E/3.14E_0)^{1/2}=0.035$ mm Step 3

Since an internal split between adjacent separate small spots (with r=0.035 mm) arises in the material if the distance between them is smaller than $d_0=0.07$ mm., the number of focal spots allocated inside a laser-induced damage for production of a black-white image should be $R^2/(r+d)^2=8$ approximately. A more accurate number of focal spots is determined by their possible arrangement inside an etch point area.

Step 4

Taking into account the finding, we see that arrangement of seven focal spots in FIG. 3(*b*) is more acceptable for etch point creation of black-white images.

Step 5

If conversion coefficient of optical system focused the main laser beam in seven focused spot points is 0,2 then the pulse energy of main laser beam should be equaled to $$7 \times 0.8/0.2 = 28 \text{ mJ}.$$

Step 6

Taking into account the grade shade dependence of a number of focal spots we find the number of spots and their arrangement needed for reproduction of grade shade images. For instance, arrangement of focal spots like in FIG. 3(*a*) reduce brightness of an etch point to twice approximately.

Figure 8:
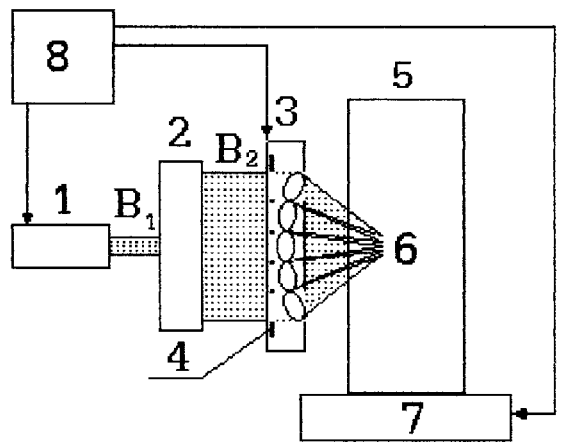
FIG. 8 is an exemplary block-diagram of a laser etching system of the invention for creation etch points with the same size and for control of their form and brightness.

A schematic diagram of the apparatus for carrying out said method is shown in FIG. 8. A laser 1 generates a narrow, intense light beam $B_1$. Once emitted from the laser 1, the pulsed beam $B_1$ passes through a beam expander 2 after that beam $B_2$ is directed to an optical system 3. The optical system 3 transfers said laser beam and focuses it in several separate spots inside an article 5 generating an etch point 6. The shutter 4 permits to form special mask so as to create right form of an etch point and its brightness by variation of a number of focal spots and their arrangement. The table 7 shifts the article 5 relative to an etch point 6. Computer 8 controls the laser 1, the optical system 3 (in particularly, the shutter 4) and the table 7.

The said optical system 3 can be produced by many different ways. FIG. 8 shows an example of the said system using an array of small lenses. Each small lens focuses a corresponding part of the wavefront. Said computer 8 controls all small lenses so that corresponding focal spots can change their position relative to each other. The shutter 4 controlled by the said computer 8 can overlap a part of said small lenses and thereby a number of small points is changed.

I claim:

1. A method of producing high quality laser-induced images inside optically transparent materials by simultaneously generating breakdowns in two or more separate focused small points comprising the steps of:

determining right form and size of an etch point;

determining optimal sizes of focal spots allocated inside etch point area;

creating said etch points for production of a black-white image;

creating etch points of the said form and size for production of an image gradation;

generating a main laser beam having a main energy level;

transforming and focusing said main laser beam into two or more separate small spots inside a transparent material area corresponding to the said etch point;

etch point brightness control.

2. The method of determination of the right form and size of an etch point in accordance with claim 1 including finding the optimal (for the material and the image) effective size and form of a laser-induced damage so as it is possible to reproduce small details of the image and its brightness would be high enough.

3. The method of determination of a focal spot in accordance with claim 1 including finding the optimal (for the material) size of a focal spot which should be much smaller than the said etch point but not very small so as an energy threshold is not very large.

4. The method of creation of etch points with the said form and size for production of a black-white image in accordance with claim 1 including determination of a number of focal spots and their arrangement inside an etch point area so as the said number is maximal and distance between adjacent separate small spots should be equal to a distance threshold.

5. The method of creation of etch points with the said form and said size for production of an image gradation in accordance with claim 1 including controlling of a number of focal spots and their arrangement inside an etch point area so as the etch point reproduce right brightness and distance between adjacent separate small spots should be larger than said distance threshold.

6. The method of determination of a main energy value of a main laser beam in accordance with claim 1 including summation of energy portions of all focal spots.

7. The method of transformation and focusing of said main laser beam into two or more separate small spots inside the transparent material area in accordance with claim 1 including an array of small lenses each of which focuses a corresponding part of the wavefront into corresponding focal spot of etch point area; each said lens is controlled by a computer so as corresponding to it focal spot can be removed inside the said etch point area.

8. The method of etch point brightness control in accordance with claim 1 including a shutter controlled by a computer, the said shutter can overlap a part of said small lenses and thereby a number of small points of the said etch point can be changed.

* * * * *